Figure 4:
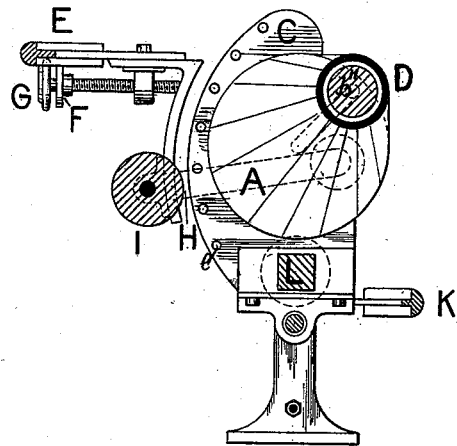

(No Model.) 5 Sheets—Sheet 1.
G. TILSTONE.
MACHINE FOR STRETCHING OR REMOVING CREASES FROM WOVEN FABRICS.
No. 504,001. Patented Aug. 29, 1893.
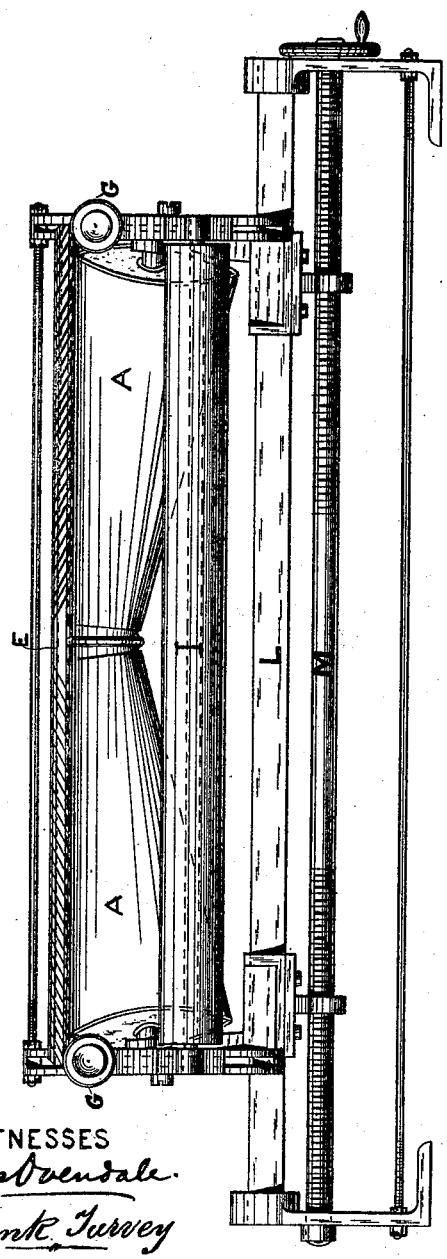
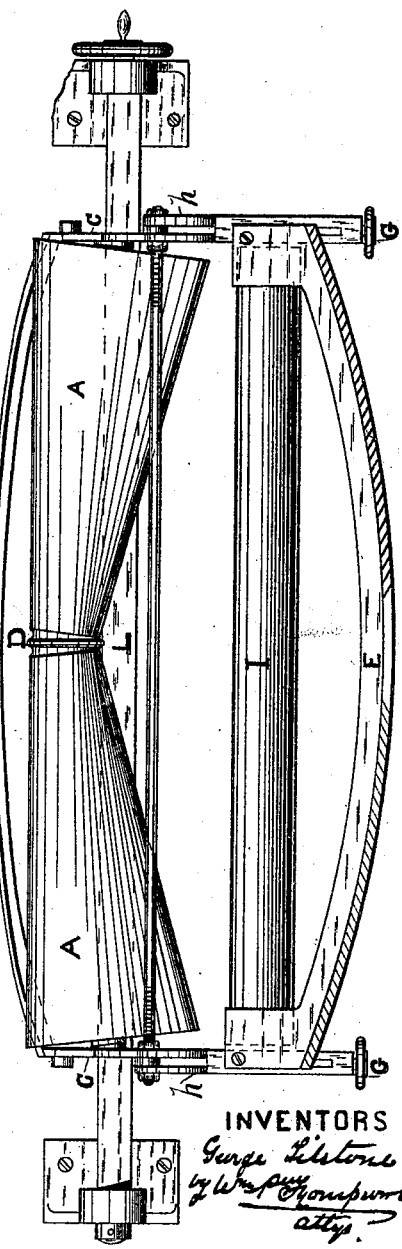
WITNESSES
Chas Ovendale.
Frank Turvey
INVENTORS
George Tilstone (No Model.)　　　　　　　　　　　　　　　　5 Sheets—Sheet 2.
G. TILSTONE.
MACHINE FOR STRETCHING OR REMOVING CREASES FROM WOVEN FABRICS.

No. 504,001.　　　　　　　　　　Patented Aug. 29, 1893.

WITNESSES　　　　　　　　　　　　　　INVENTOR
Chas B Kendale.　　　　　　　　　　　Geo Tilstone
Joseph Bates.　　　　　　　　　　　　by Wm P Thompson & Co.
　　　　　　　　　　　　　　　　　　　　attys.

(No Model.) 5 Sheets—Sheet 3.

G. TILSTONE.
MACHINE FOR STRETCHING OR REMOVING CREASES FROM WOVEN FABRICS.

No. 504,001. Patented Aug. 29, 1893.

WITNESSES
Chas. Ovendale.
Frank Turvey

INVENTOR
George Tilstone
By Wm. P. Thompson & Co.
attys.

(No Model.)  5 Sheets—Sheet 4.

G. TILSTONE.
MACHINE FOR STRETCHING OR REMOVING CREASES FROM WOVEN FABRICS.

No. 504,001.  Patented Aug. 29, 1893.

WITNESSES  
Chas. Ivendale.  
Frank Turvey

INVENTOR  
George Tilstone  
by L. W. P. Simpson & Co.  
attys.

(No Model.)
5 Sheets—Sheet 5.
G. TILSTONE.
MACHINE FOR STRETCHING OR REMOVING CREASES FROM WOVEN FABRICS.
No. 504,001.
Patented Aug. 29, 1893.
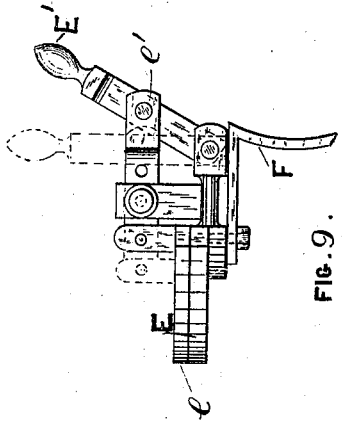
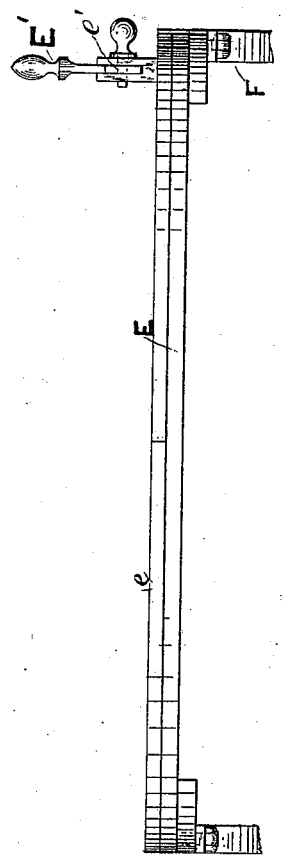
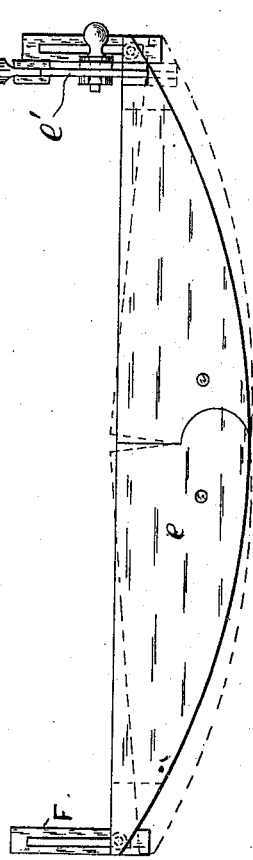
WITNESSES
INVENTOR

UNITED STATES PATENT OFFICE.

GEORGE TILSTONE, OF CHURCH, ENGLAND.

MACHINE FOR STRETCHING OR REMOVING CREASES FROM WOVEN FABRICS.

SPECIFICATION forming part of Letters Patent No. 504,001, dated August 29, 1893.

Application filed April 12, 1892. Serial No. 428,881. (No model.) Patented in England December 8, 1891, No. 21,470.

*To all whom it may concern:*

Be it known that I, GEORGE TILSTONE, a subject of the Queen of Great Britain, residing at Church, in the county of Lancaster, England, have invented certain new and useful Improvements in Machines for Stretching or Removing Creases from Woven Fabrics, (for which a patent has been obtained in Great Britain, dated December 8, 1891, No. 21,470,) of which the following is a specification.

This invention relates to apparatus for stretching laterally or removing creases or folds from cloth or woven fabrics as it passes through the various machines in which it is treated during the processes of dyeing, bleaching or finishing, being specially designed for handkerchiefs and shawls though it may be applied to machines for open soaping and dye gigs or to any other machines when it is desired that the cloth should be made straight and open either on entering or leaving the machine. This class of stretchers or openers as hitherto constructed has been provided with a pair of cone drums set inclined one to another. These drums have been mounted to revolve on revolving shafts fixed to them and mounted in bearings at each end with a center pedestal and great difficulty has hitherto been experienced in preventing the cloth being damaged either by the ends of the cones or by the cover placed over the junction of the two ends.

This invention consists essentially in constructing the apparatus with the cones mounted to revolve on a fixed shaft without central bearing or support and a loose rotating disk or ring between the ends of the cones and with an adjustable segmental or curved guide board or rail or sectional roller which can be adjusted in its position relative to the inclined cones by a quadrant and lever.

The invention will be fully described with reference to the annexed drawings, in which—

Figure 2:
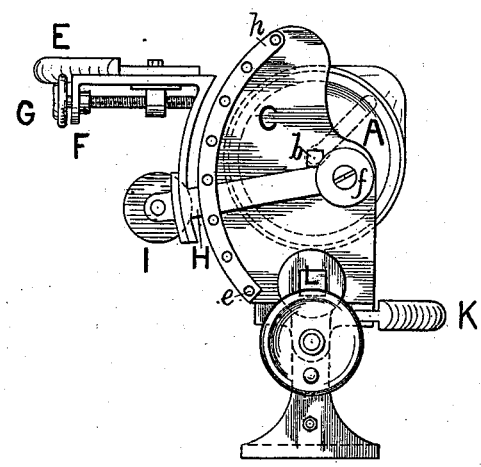
Figure 5:
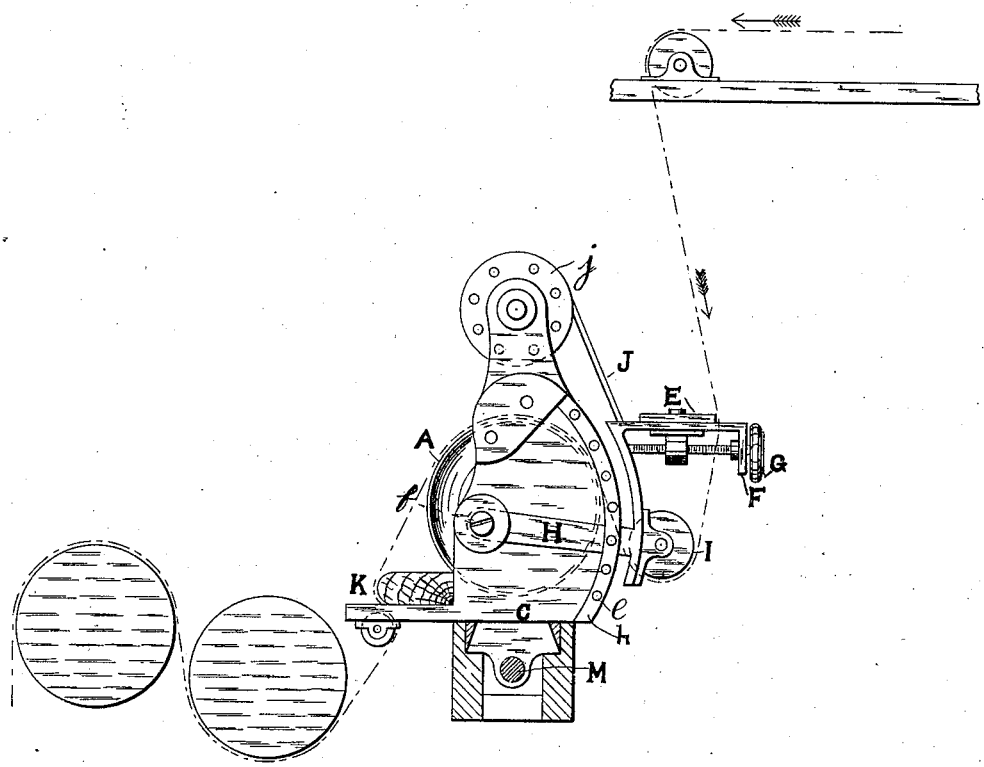
Figure 6:
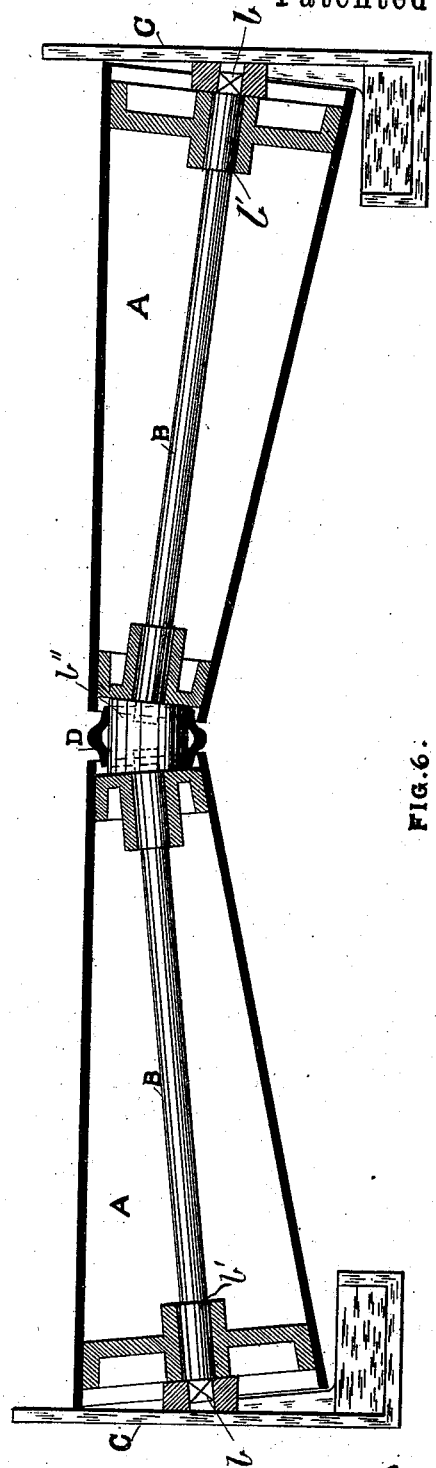

Figure 1. represents a side elevation of the apparatus constructed according to my invention; Fig. 2. an end elevation; Fig. 3. a plan; Fig. 4. a transverse sectional elevation; Fig. 5. an end elevation with a slight modification showing the relative position of the apparatus and the rollers of the machine in conjunction with which it works; Fig. 6. a longitudinal sectional elevation; Fig. 7. a modified form of segmental rail made in three parts adjustable to increase or reduce the stretching power; Fig. 8. a front elevation of same; Fig. 9. an end elevation of same.

The cones A which are of ordinary construction either plain or serrated I mount upon a fixed or stationary shaft B upon which they can rotate freely and independently of each other the cones being rotated by the passage of the cloth over them. The fixed or stationary shaft B, upon which the cones A are mounted is constructed in three parts the end parts $b'$ upon which the cones A rotate and the central part $b''$ to which the two end parts $b'$ are affixed. The shaft composed of these three parts is held in position by the ends $b$ being inserted in a square or angular hole in the end plate or framing C. The ends $b$ are preferably square but may be of any shape and secured in the frame C by set screws, bolts, keys or pins. The end parts $b'$ upon which the cones rotate are fixed at an angle or inclination one to the other corresponding with the inclination at which the cones are intended to work to set the surface of the cones which is highest and farthest back in approximately a straight line. The two end parts $b'$ are turned and the third or central part $b''$ is in the form of a block or coupling bored at each side to the required angle into which the two end pieces $b'$ fit and may be secured by being shrunk on or by a pin, screw or key. Instead of being formed from three distinct parts the shaft B may either be cast or forged in one piece to the required pattern and then turned and finished. By thus adjusting and fixing the shaft B for the cones to rotate loosely upon it central bearings or steps to support the shaft are entirely dispensed with.

Upon the central part $b''$ of the shaft B I mount a small disk, bush or ring D, to run loosely thereon and fill up the space between the ends of the cones A. The ring D is preferably formed rather higher in the center than at the sides, the lower part fitting under the edges of the cone ends and the raised part between the two ends of the cones. Below or in front of the inclined cones I fix a curved or segmental board or metal rail E fixed so that one side of the fabric passes over in contact with the face of it and the other side of the fabric passes over in contact with the cones A whereby all crimps, folds, creases or double edges are removed from both sides of the fabric. The face or edge of the segmental rail E may be serrated or crimped as shown for the whole or a part of its length to assist its action of stretching or straightening out the fabric. The stretching rail E is mounted upon brackets F upon which it can be moved to and from the cones A and it is secured and its position adjusted by the screws G. By this arrangement if the cloth or fabric should not be guided straight to the opening or stretching cones and one edge is in advance of the other by adjusting this board or rail to put more friction on the advancing edge the cloth may be made to pass through straight without any necessity for the attendant touching it.

The segment or rail E may be made in one piece as shown in Figs. 1 to 4 or may be made in two or more parts as shown in Figs. 7, 8, 9 wherein the parts $e$ which are pivoted to E can be moved in and out by the lever E' and connecting rod $e'$ to alter or adjust the curve of the rail.

In addition to the to and fro movement upon the brackets F the rail E, together with the brackets F upon which it is mounted is movable about a fixed center $f$ (nearly coindent with the center of the cones). The position of the bracket F about the center $f$ is regulated and adjusted by the quadrant lever H and quadrant $h$ the bracket being held when adjusted by a pin passed through the holes $e$.

Mounted upon the brackets F and working in conjunction with the rail E is a small roller I over which the cloth passes to present the opposite side of it to the cones A.

In order to raise the brackets F at both ends of the machine simultaneously they may have each affixed to them a strap or chain J passing over a pulley or wheel $j$ (see Fig. 5) the pulleys at each end being connected together by a shaft, so that both can be moved at the same time from either end of the machine. A second curved or segmental rail K may be placed at the other side of the cones A against which the cloth comes in contact after leaving the cones A. This rail is preferably provided with a smooth face and is stationary in relation to the framing C.

The curved or segmental board or rail (E or K) is adapted and may be applied by itself alone for stretching fabrics in such machines as dye machines, open dyeing machines, open soapers, open washers, open bleaching machines, printing machines, calendering machines, steaming machines and any machines requiring cloth to be kept straight and free from creases.

The segmental rail may be in one or more parts and may be adjusted by screws, levers, rack and pinion, quadrant and rack or other mechanism from outside the machine. As it will work either in liquor or out of it the cloth or fabric can be wet or dry.

The cones A may be made of any suitable material, wood or metal and their surfaces may be rough or smooth, preferably roughened or serrated in appearance like the surface of a file or rasp over about two-thirds of their surface extending inward from the outer edge the other part being preferably left smooth. The central disk or bush is turned to shape with a smooth surface, the raised or central part of it rising level with the ends of the cones, so that the fabric will pass backward and forward over the inner ends of the cones without any injury to the fabric or fear of its getting caught between the cone ends thus dispensing with the use of guards to cover the ends of the cones.

The frames C which support the inclined cones A and the fixed shaft B are mounted upon a cross bar L so that they can be moved backward and forward by a screw M engaging with one of the brackets to suit the different widths of cloth. Thus one, two or more openers or sets of cones can be mounted on one bar L and shifted by the screw M or by hand so that one, two or more openers or stretchers can be run at the same time according to the width of the cloth without fear of one overlapping the other.

In the modification shown in Fig. 5 instead of being mounted upon a bar such as L the frame C is mounted on an ordinary dovetail slide and is moved to and fro by the screw M.

These openers or stretchers can be fixed within one inch of the drying cans or cylinders. Consequently all the width of the fabric secured by the opener is maintained as the cloth passes onto the cylinder or receiver. I consider that by this arrangement and construction better and quicker work is performed without marking or damage to the cloth hitherto occasioned by the central cover and that in the case of narrow cloth should it all get upon one cone it will travel back and forward across the central disk or bush without getting between the ends of the cones or without damage or mark to a delicate fabric.

What I claim, and desire to secure by Letters Patent, is—

1. In a machine for stretching or removing creases from woven fabrics the combination with the truncated cones A, of the fixed stationary shaft B composed of the end parts $b'$ $b'$ and the center piece $b''$ fitted together upon which the cones rotate the two end parts being inclined one to the other and the side supporting frames C in which the ends are fixed substantially as described.

2. In a machine for stretching or removing creases from woven fabrics the combination with the stretching cones A rotating on the shaft B, of the fixed shaft B composed of the end parts $b'$ $b'$ at an inclination to each other and the enlarged central piece $b''$, the bush D between the ends of the cones to prevent the fabric catching therein and the supporting frames C provided with bearings in which the ends of the shaft B are fixed.

3. In a machine for stretching or removing creases from woven fabrics the combination with the stretching cones A, of the adjustable curved segmental rail E, the supporting bracket F upon which the rail slides, the screws G by which it is moved to and from the cones, the quadrant lever H by which it is moved about the center of the cones, and the tension roller I.

4. In a machine for stretching or removing creases from woven fabrics the combination with the stretching cones A, of the curved segmental rail E over which the cloth also passes, the supporting brackets F upon which the curved rail rests the tension roller I and a second curved segmental rail K to give an additional stretch to the fabric substantially as described.

5. In a machine for stretching or removing creases from woven fabrics the combination with the truncated stretching cones A and supporting frame C, of the longitudinal bar L upon which the framing carrying the cones is supported and slides and the screw M by which the position of the framing C and cones A upon the supporting bar L can be altered or moved.

6. In a machine for stretching or removing creases from woven fabrics the combination with the truncated stretching cones A the stretching rails E and K and the tension roller I, of the supporting framing C which carries the cones, the bracket F upon which the rail E slides, the quadrant H by which the rail E is raised and lowered, the slide bar L upon which the framing slides and screw M which moves the frame to and fro thereon substantially as and for the purposes described.

In testimony whereof I have signed my name to this specification in the presence of two subscribing witnesses.

GEORGE TILSTONE.

Witnesses:
JOSHUA BARDSLEY,
HARPER WESTELL.